United States Patent
Lundgren et al.

(10) Patent No.: US 6,409,062 B1
(45) Date of Patent: Jun. 25, 2002

(54) LOAD CARRIER STRUT AND A METHOD FOR ITS MANUFACTURE

(75) Inventors: Anders Lundgren, Grimsås; Jan-Ivar Arvidsson; Håkan Thulin, both of Hillerstorp, all of (SE)

(73) Assignee: Industri AB Thule (SE)

( * ) Notice: Subject to any disclaimer, the term of this patent is extended or adjusted under 35 U.S.C. 154(b) by 0 days.

(21) Appl. No.: 09/515,477

(22) Filed: Feb. 29, 2000

Related U.S. Application Data

(63) Continuation of application No. 08/983,423, filed on Jan. 2, 1998, now abandoned, which is a continuation of application No. PCT/SE96/00735, filed on Jun. 4, 1996.

(30) Foreign Application Priority Data

Jul. 6, 1995 (SE) ................................................ 9502455

(51) Int. Cl.⁷ ................................................. B60R 9/04
(52) U.S. Cl. ...................................... 224/309; 224/322
(58) Field of Search ................................ 224/309, 321, 224/322, 325, 326, 319

(56) References Cited

U.S. PATENT DOCUMENTS

| | | | | |
|---|---|---|---|---|
| 4,501,385 A | * | 2/1985 | Bott | 224/319 |
| 5,090,605 A | * | 2/1992 | Cucheran | 224/321 |
| 5,667,116 A | * | 9/1997 | Rienhart et al. | 224/319 |

FOREIGN PATENT DOCUMENTS

| | | | | |
|---|---|---|---|---|
| JP | 406032178 | * | 1/1994 | 224/309 |
| WO | 94/00315 | * | 1/1994 | |

* cited by examiner

*Primary Examiner*—Gregory M. Vidovich
(74) *Attorney, Agent, or Firm*—Kilpatrick Stockton LLP

(57) ABSTRACT

A load carrier strut adapted to be secured to a vehicle roof. The load carrier strut includes a slot with an opening extending into an interior portion of the load carrier strut. The slot opening being formed by at least one defining edge and adapted to be engaged with an engageable member. A protective skin covers at least a portion of the load carrier strut. The protective skin extends over the slot opening and covers at least a portion of the at least one defining edge of the slot opening. The load carrier strut includes a notch located in the at least one defining edge of the slot proximate an end of the load carrier strut. The protective skin engages in the notch thereby securing the protective skin longitudinally with respect to the load carrier strut.

22 Claims, 1 Drawing Sheet

LOAD CARRIER STRUT AND A METHOD FOR ITS MANUFACTURE

Figure 1:
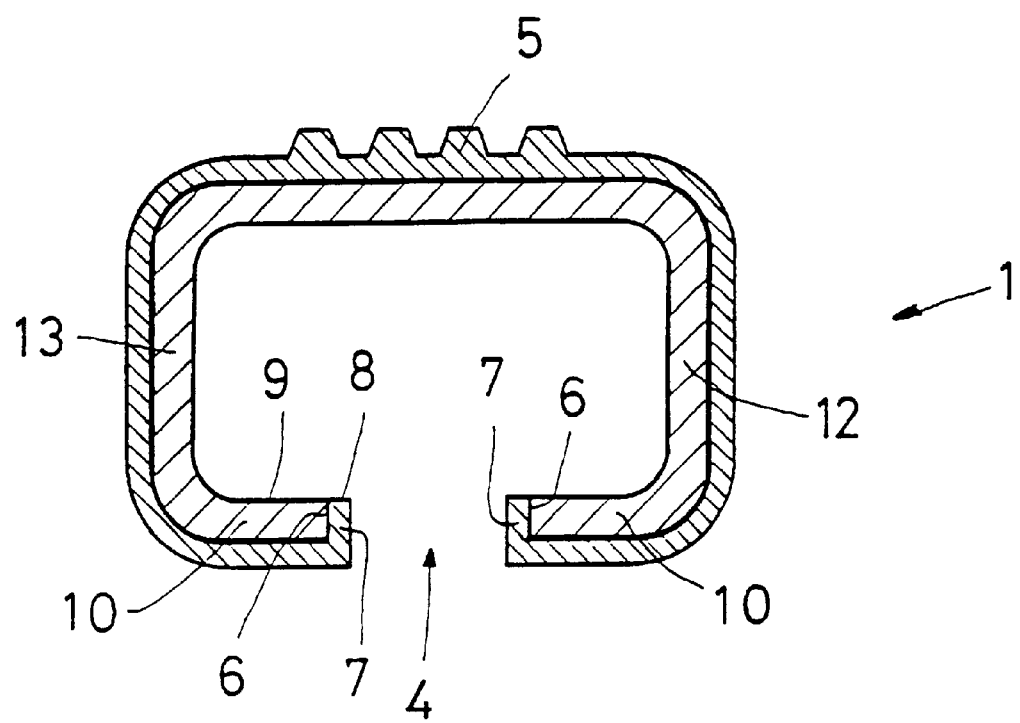

This application is a continuation of application Ser. No. 08/983,423 filed Jan. 2, 1998, now abandoned, which is a continuation of international application No. PCT/SE96/00735 filed Jun. 4, 1996.

TECHNICAL FIELD

The present invention relates to a load carrier strut which is designed to be secured, with at least one end portion, in a load carrier foot which is fixable on a vehicle roof, the load carrier strut having a hollow profile, being exteriorly provided with an enveloping protective skin of plastic, rubber or similar material, and having at least one longitudinal slot through which extend means for securing the load carrier strut to the load carrier foot, or for securing a load or load carrying device on the load carrier strut.

The present invention also relates to a method of manufacturing a load carrier strut which is designed to be secured, with at least one end portion, in a load carrier foot which is fixable on a vehicle, the load carrier strut being given hollow profile, being exteriorly provided with an enveloping protective skin of plastic, rubber or similar material, and at least one longitudinal slot.

BACKGROUND ART

Load carrier struts of the type disclosed by way of introduction are previously known in the art. Normally, these load carrier struts have an interior of metal which is produced from hollow profiles whose cross section may be rectangular, circular or substantially oval. Most generally, the load carrier strut is provided on its underside and along its opposing end portions with longitudinal slots which are employed for the insertion of a suitable clamping device on a load carrier foot, so that this may be clamped in place on the load carrier strut at any optional position along the length of the slot.

It may also occur that the load carrier foot and load carrier strut are joined together in a different manner but that the load carrier strut has one or more longitudinal slots or undercut grooves for securing a load or a load-carrying device.

In order to protect the load carrier strut from corrosion, and the load borne by the load carrier strut from damage, it is normal that the load carrier strut be provided with an external, protective skin or coating of plastic, rubber or similar material. Normally, this protective skin is extruded about the load carrier strut so as to form a sheath or envelope about the strut. Adhesion between this envelope and the subjacent metal material may be defective, but as long as the envelope or protective skin is undamaged and displays no longitudinal breaches of any appreciable length, this circumstance is of minor importance.

When longitudinal slots are made in a load carrier strut provided with a protective skin in this manner, those portions of the protective skin that are located around the slot will have no adhesion to the substrate, for which reason these parts of the protective skin may readily be damaged, deformed or otherwise destroyed. Further, the surfaces which define the slot are freely exposed to corrosion.

Problem Structure

The present invention has for its object to realize a load carrier strut of the type disclosed by way of introduction, the load carrier strut being designed in such a manner that the drawbacks inherent in prior art versions are obviated. In particular, the present invention has for its object to realize a load carrier strut in which the protective skin lodges securely in place despite the presence of a longitudinal slot and in which the surfaces on the load carrier strut defining the slot are protected against corrosion.

The present invention further has for its object to realize a load carrier strut which is simple and economical to manufacture.

The present invention still further has for its object to realise a method of the type disclosed by way of introduction, the method permitting the manufacture of a load carrier strut in which the resulting protective skin is held in place on either side of the longitudinal slot and in which the surfaces on the load carrier strut proper which define the slot are protected against corrosion.

Solution

The objects forming the basis of the present invention will be attained in respect of the load carrier strut, if this is characterized in that the protective skin is disposed to cover at least the major portion of those surfaces on the load carrier strut which define the slot therein.

The objects forming the basis of the present invention will be attained in respect of the method, if this is characterized in that the slot is made in the load carrier strut before this is provided with the protective skin, that this skin is applied to the load carrier strut in sheath-like formation and also covering the slot, that a recess is formed in the portion of the protective skin covering the slot, the recess being made smaller than the slot so that the protective skin is given a projecting portion which extends somewhat outside that edge which defines the slot, and that the projecting portion is formed so as to cover at least the major portion of the surfaces on the load carrier strut defining the slots.

BRIEF DESCRIPTION OF THE ACCOMPANYING DRAWING

Figure 2:
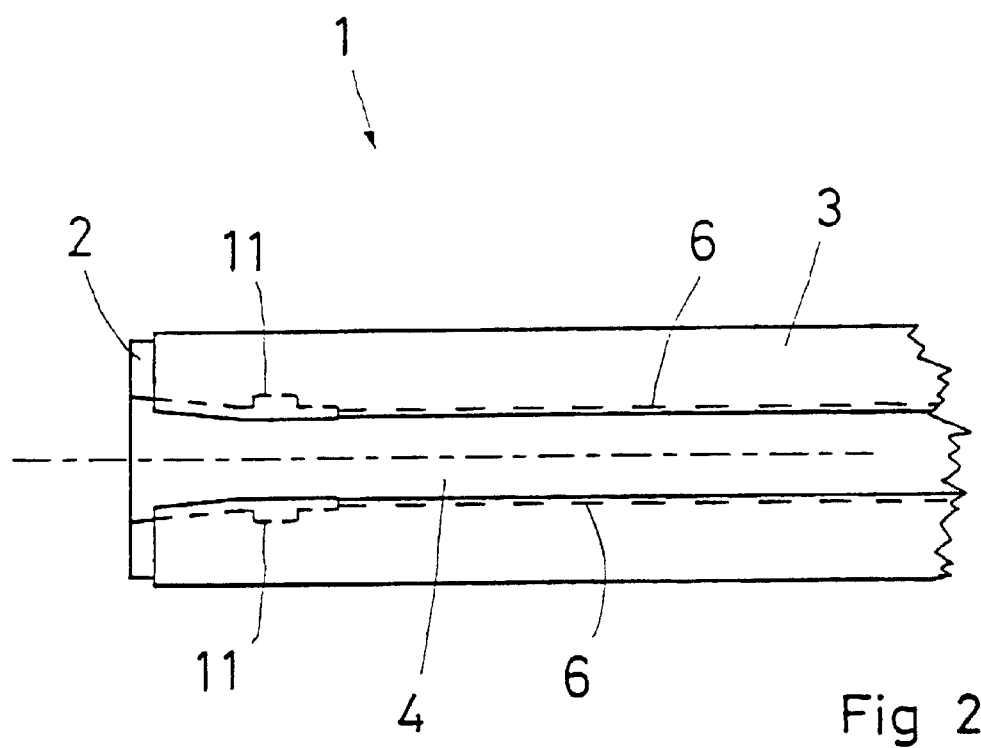

The present invention will now be described in greater detail hereinbelow, with particular reference to the accompanying Drawing. In the accompanying Drawing:

FIG. 1 is a cross section through one embodiment of a load carrier strut in the region of a longitudinal slot therein; and FIG. 2 shows the load carrier strut of FIG. 1 seen in plan view and from that side where the slot is located.

DESCRIPTION OF PREFERRED EMBODIMENT

A load carrier of the type which is normally employed for the transport of a load on a vehicle roof has a load carrier strut 1 which extends transversely over the vehicle roof and which, at its opposing ends, has a foot by means of which the load carrier is secured in opposing edge portions of the vehicle roof. In order to make such a load carrier applicable to different types and models of vehicles, a length-adaptation is required of the load carrier strut, or a relative displacement between the load carrier strut and its feet. In certain designs and constructions, the load carrier strut is passed wholly through a stirrup or corresponding aperture in the foot and is hereby clamped in place in an appropriate adjustment position. In this alternative, the design and construction of the load carrier strut is of minor importance, since its interior is not employed for the interconnection operation.

In other designs and constructions, the load carrier strut is hollow and has, at its opposing end regions, longitudinal slots on the underside through which interconnecting devices on the foot are passed into the interior of the load carrier strut so that this, by activation of these interconnecting devices, may be secured in an optional position on the foot. The present invention is intended to be applied to this latter type of load carrier strut.

In another situation in which the present invention may be applied, the load carrier strut may be a profile with an undercut groove which is intended for the securing of a load or some type of load carrier device. Such a load carrier strut may also be longitudinally directed in relation to the vehicle, and, for example, be included in or form part of a so-called roof railing.

FIGS. 1 and 2 show the present invention applied to a load carrier strut 1 which has an inner, hollow profile 2 of metal, the profile being the actual load carrying means in the load carrier strut. In the embodiment illustrated on the Drawings, the profile 2 is approximately rectangular in cross section and has been produced as a metal tube with this design.

In order to protect the profile 2 against corrosion, but also to protect a load which is carried by the load carrier strut 1, the load carrier strut has an outer protective skin 3 which consists of plastic, rubber or similar material. The protective skin 3 surrounds the profile 2 in the form of a sheath or envelope and tightly abuts against its outer surface. At least those portions where the protective skin 3 is unbroken in the circumferential direction, the skin is stretched somewhat about the profile 2 in the circumferential direction because the protective skin has shrunk slightly after being applied in place.

On its upper side, the protective skin 3 may suitably have a number of longitudinal ribs or ridges 5 or thickened portions which are intended to increase the friction against a load, and also to improve the resistance of the protective skin to wear and similar abrasive action.

The load carrier strut 1 which is shown in the Drawings may be approximately one meter in length and has, at each end, a longitudinal slot 4 which may be of a length of the order of magnitude of between about 10 and about 20 cm, so as to permit adjustment of the position of the feet whereby the load carrier strut is secured to the vehicle. The longitudinal slot 4 has opposing defining surfaces 6 in the profile 2 and also an end defining surface which is not shown in the Drawings, but which may suitably be arched roughly along a circular arc.

The protective skin 3 has inwardly directed portions 7 which are disposed to cover at least the major portion of the defining surfaces 6 of the slot 4. The inner end surfaces 8 of these inwardly directed portions 7 are suitably flush with the inside 9 of the bottom wall 10 of the profile 2. The inwardly directed portions 7 of the protective skin 3 will thereby not prevent a part from sliding interiorly in the profile 2 on its inside 9 in its movement in the longitudinal direction of the load carrier strut.

In other situations, where the parts disposed interiorly in the profile make this possible, the inwardly directed portions 7 may, however, extend round about the defining surfaces 6 around the slot 4 and also partly cover the inside 9 of the profile 2.

As was mentioned above, the protective skin 3 has a tendency to shrink some time after being applied on the profile 2. If the inwardly directed portions 7 are produced before any substantial shrinkage has had time to take place in the protective skin, the skin will also be stretched in the circumferential direction along those parts of the load carrier strut where the slot 4 is located, because the inwardly directed portions 7 act as catches in cooperation with the edge or defining surfaces 6. The inwardly directed portions 7 will hereby be pressed towards the surfaces defining the slot. However, this requires a certain degree of rigidity in the material from which the protective skin 3 is produced, and, naturally, a certain material thickness in the inwardly directed portions 7 as well as the transitional region between these portions and adjacent portions of the protective skin, mention might be made of polyethylene or polypropylene, in which event the material thickness in the protective skin 3 and its inwardly directed portions 7 may be of the order of magnitude of about 0.6 to about 1 mm. Suitable material thickness for the profile 2 shown in the Drawings, may be approximately 2 mm.

It will be apparent from FIG. 2 that the defining surfaces 6 about the longitudinal slot 4 have recesses 11 in the proximity of the end of the load carrier strut 1. The inwardly directed portions 7 are designed to extend in to these recesses 11 or to be provided with heels on their sides facing towards the bottom of the recesses so that the recesses are substantially filled by the material from which the protective skin 3 is produced. The shrinkage which the material in the protective skin 3 undergoes not long after application naturally also implies a shrinkage in the longitudinal direction of the load carrier strut 1 and, as a result of the presence of these recesses 11 in the profile 2, together with the engagement between the protective skin 3 and the recesses, the protective skin is reliably positionally fixed in the longitudinal direction of the load carrier strut.

The production of the load carrier strut 1 proceeds as follows. The profile 2 is cut to the intended length, whereafter the longitudinal slots 4 are made, preferably by cutting or punching. Because of the length of the slots, it is appropriate to make the slots in several stages. Once the profile 2 has been completed in this manner, it is provided with the protective skin 3 in that this is extruded in sheath or envelope form onto the outside of the profile. The extruded plastic or rubber material will hereby also cover the slots 4. As soon as possible after the extrusion process, and as soon as the protective skin has attained a sufficient degree of configurational stability—but has preferably not had time to initiate any shrinkage of note, apertures are made in the protective skin above those regions where the slots 4 are located. However, the apertures are made smaller than the slots, such that the protective skin will have a projecting edge portion which covers the slots somewhat. The projection over the edges of the slots may appropriately be of the order of magnitude of between 1.5 and 2 mm. Thereafter, the projecting portions of the protective skin are formed such that they are shaped for the creation of the inwardly directed portions 7, partly by mechanical forming and partly by the supply of heat, such that the material in the projecting portions/the inwardly directed portions 7 will become plastically mouldable. During this forming operation, it is appropriate to press at least those parts of the protective skin 3 which are located on the sides 12 and 13 of the profile 2 in towards the interior of the profile so that good abutment is obtained against the subjacent profile material.

The mechanical forming of the inwardly directed portions 7 may suitably be effected using a stamp or punch which is of the same configuration as that space which is to be left in the slot 4 once account has been taken of the space requirements of the inwardly directed portions 7. This implies that the punch must be of a thickness or width which is less than the width of the slot in the profile 2 by approximately 1.5 mm. The supply of heat to the inwardly directed portions 7 may suitably be effected by ultrasound, whereby only plastic material is heated without any thermal generation taking place in the punch or metal in the profile 2. It will hereby be possible to supply heat in a highly concentrated and locally restricted manner during the brief, limited time which is required for the forming process proper.

In the foregoing, the present invention has been described as applied to a profile 2 of roughly rectangular cross section. According to the present invention, the profile 2 is hollow, but may have a completely different outer contour than that described above. For example, the profile may be circular, oval or elliptical in cross section, and may interiorly (above all in those cases when it consists of an extruded aluminium profile), have inner rigidifying walls or walls which form undercut grooves for mounting of a load or a load carrying device.

The present invention should not be considered as restricted to that described above and shown in the Drawings, many modifications being conceivable without departing from the spirit and scope of the appended Claims.

What is claimed is:

1. A method of manufacturing a load carrier strut adapted to be secured to a vehicle rood, said method comprising:
    providing a load carrier strut having a slot with an opening extending into an interior portion of said load carrier strut, said slot opening being formed by at least one defining edge;
    covering said load carrier strut with a protective skin;
    extending a portion of said protective skin over said slot thereby covering at least a portion of said at least one defining edge of said slot; and
    opening said portion of said protective skin extending into said slot thereby opening said interior portion of said load carrier strut through said slot and said protective skin for accepting an engageable member.

2. The method as recited in claim 1, said method further comprising:
    forming a notch in said at least one defining edge of said slot proximate an end of said load carrier strut; and
    engaging said protective skin in said notch for securing said protective skin longitudinally with respect to said load carrier strut.

3. The method as recited in claim 1; said method further comprising:
    establishing a projecting portion of said protective skin that extends inwardly into said load carrier strut at said at least one defining edge of said slot.

4. The method as recited in claim 3; said method further comprising:
    forming a notch in said at least one defining edge of said slot proximate an end of said load carrier strut; and
    causing said notch to be more narrow than a width of said slot thereby permitting the protective skin to be at least partially inserted into said slot.

5. The method as recited in claim 3; said method further comprising:
    securing said projecting portion of said protective skin about said at least one defining edge of said slot so that said projecting portion resists disengagement from said at least one defining edge of said slot.

6. The method as recited in claim 3; said method further comprising:
    forming said projecting portion into a catch that secures upon said at least one defining edge of said slot thereby securing said protective skin about said load carrier strut.

7. The method as recited in claim 3; said method further comprising:
    forming said projecting portion of said protective skin about said at least one defining edge of said slot by mechanical forming under a heat supply.

8. The method as recited in claim 7; said method further comprising:
    limiting heating effects of said heat supply to said protective skin.

9. A method of manufacturing a load carrier strut adapted to be secured to a vehicle roof, said method comprising:
    providing a load carrier strut having a slot with an opening extending into an interior portion of said load carrier strut, said slot opening being formed by at least one defining edge;
    covering said load carrier strut with a protective skin;
    extending a portion of said protective skin over said slot thereby covering said at least one defining edge of said slot;
    forming a notch in said load carrier strut;
    engaging said protective skin in said notch for securing said protective skin longitudinally with respect to said load carrier strut; and
    locating said notch in said at least one defining edge of said slot.

10. A method of manufacturing a load carrier strut adapted to be secured to a vehicle roof, said method comprising:
    providing a load carrier strut having a slot with an opening extending into an interior portion of said load carrier strut, said slot opening being formed by at least one defining edge;
    covering said load carrier strut with a protective skin;
    extending a portion of said protective skin over said slot thereby covering at least a portion of said at least one defining edge of said slot;
    forming a recess in a portion of the protective skin at said slot;
    establishing a projecting portion of said protective skin at said recess that extends inwardly into said load carrier at said at least one defining edge of said slot;
    forming said projecting portion into a catch that secures upon said at least one defining edge of said slot thereby securing said protective skin about said load carrier strut; and
    permitting shrinkage of said protective skin thereby circumferentially tightening said protective skin about said load carrier strut.

11. A load carrier strut adapted to be secured to a vehicle roof, said load carrier strut comprising:
    a load carrier strut having a slot with an opening extending into an interior portion of said load carrier strut, said slot opening being formed by at least one defining edge and adapted to be engaged with an engageable member;
    a protective skin covering at least a portion of said load carrier strut, said protective skin having a portion extending over said slot opening and covering at least a portion of said at least one defining edge of said slot opening;
    a notch formed in said load carrier strut;
    said protective skin engaged in said notch thereby securing said protective skin longitudinally with respect to said load carrier strut; and
    said notch being located in said at least one defining edge of said slot proximate an end of said load carrier strut.

12. The load carrier strut as recited in claim 11; further comprising:
    said portion of said protective skin extending into said slot having a slit opening for opening said interior portion of said load carrier strut through said slot and said protective skin.

13. A load carrier strut adapted to be secured to a vehicle roof, said load carrier strut comprising:

a load carrier strut having a slot with an opening extending into an interior portion of said load carrier strut, said slot opening being formed by at least one defining edge and adapted to be engaged with an engageable member;

a protective skin covering at least a portion of said load carrier strut, said protective skin having a recess in a portion thereof at said slot opening;

said recess establishing a projecting portion of said protective skin that extends inwardly into said load carrier strut and about at least a portion of said at least one defining edge of said slot opening; and said protective skin being circumferentially tight about said load carrier strut as a result of shrinkage in said protective skin and said projecting portions being caught on said at least one defining edge.

14. The load carrier strut as recited in claim 13; further comprising:

said projecting portion of said protective skin being secured about said at least one defining edge of said slot opening so that said projecting portion resists disengagement from said at least one defining edge of said, slot opening.

15. The load carrier strut as recited in claim 13; further comprising:

said projecting portion forming a catch secured upon said at least one defining edge of said slot opening thereby securing said protective skin about said load carrier strut.

16. A method of manufacturing a load carrier strut adapted to be secured at an end portion in a load carrier foot that is fixable on a vehicle roof, said method comprising:

providing a load carrier strut having at least one longitudinal slot therein, said at least one longitudinal slot establishing a profile defined by exterior surfaces of said load carrier strut;

enveloping said load carrier strut in a protective skin constructed from a material selected from the group consisting of plastic and rubber, said enveloping step includes covering said at least one longitudinal slot;

mechanically forming under a supply of heat a recess in a portion of said protective skin covering said at least one longitudinal slot thereby causing a projecting portion of said protective skin to protrude into said at least one longitudinal slot, said projecting portion having a width smaller than a width of said at least one longitudinal slot;

causing said projecting portion to extend at least partially beyond edge surfaces of said load carrier strut that define said at least one longitudinal slot thereby forming said projecting portion to cover at least a majority of said exterior surfaces defining said profile of said at least one longitudinal slot.

17. The method as recited in claim 16; wherein said steps of forming said recess and said projecting portion further comprises:

securing portions of said protective skin surrounding said exterior surfaces defining said profile thereto for stretching said protective skin in a direction toward an open area defined by said at least one longitudinal slot.

18. A method of manufacturing a load carrier strut, said method comprising:

providing a load carrier strut having a tube-like hollow sectional shape;

forming a slot in a wall of said hollow profile;

covering said strut, including said slot with a protective skin; and providing an opening through said skin at said slot.

19. The method of claim 18; said method further comprising:

forming said opening through said skin with a width smaller than a width of said slot so that said skin is given first edge portions extending beyond the longitudinal edges of the slot; and forming said first edge portions to cover longitudinal edge surfaces of said slot.

20. The method of claim 18, said method further comprising:

forming said slot with an open end at an end of said strut and an opposed closed end;

forming said opening with a length shorter than a length of said slot so that said skin is given a first edge portion extending beyond an end edge of said slot; and forming said first edge portion to cover an end edge surface of said slot.

21. The method as recited in claim 18, said method further comprising:

forming a notch in an edge of said slot proximate an end of said load carrier strut; and engaging said protective skin in said notch for securing said protective skin longitudinally with respect to said load carrier strut.

22. A method of manufacturing a load carrier strut adapted to be secured to a vehicle roof, said method comprising:

providing a load carrier strut having a slot with an opening extending into an interior space in said load carrier strut;

extruding a plastic or rubber material onto said strut to form a protective skin covering a substantial portion of the external surface of said strut; and providing an opening through said skin to provide access to the interior space through said slot.

* * * * *